United States Patent
Isoda et al.

(10) Patent No.: US 6,895,908 B2
(45) Date of Patent: May 24, 2005

(54) EXHAUST TIMING CONTROLLER FOR TWO-STROKE ENGINE

(75) Inventors: Naoya Isoda, Shuuchi-gun (JP); Yoshiyuki Nagatsu, Shuucji-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/249,986

(22) Filed: May 23, 2003

(65) Prior Publication Data

US 2003/0168027 A1 Sep. 11, 2003

Related U.S. Application Data

(63) Continuation-in-part of application No. 09/682,457, filed on Sep. 5, 2001, now Pat. No. 6,626,145.

(30) Foreign Application Priority Data

Oct. 12, 2000 (JP) ........................................ 2000-311790
May 30, 2002 (JP) ........................................ 2002-156587

(51) Int. Cl.[7] .............................................. F02B 75/02
(52) U.S. Cl. ..................................................... 123/65 PE
(58) Field of Search ........................ 123/65 PE, 406.24, 123/65 A, 65 P (56) References Cited

U.S. PATENT DOCUMENTS

| 3,870,869 A | 3/1975 | Eberle et al. |
|---|---|---|
| 3,969,614 A | 7/1976 | Moyer et al. |
| 4,197,767 A | 4/1980 | Leung |
| 4,276,600 A | 6/1981 | Hartford et al. |
| 4,291,383 A | 9/1981 | Tedeschi et al. |
| 4,301,678 A | 11/1981 | Full et al. |
| 4,309,759 A | 1/1982 | Tokuda et al. |
| 4,309,971 A | 1/1982 | Chiesa et al. |
| 4,380,800 A | 4/1983 | Wilkinson |
| 4,403,584 A | 9/1983 | Suzuki et al. |
| 4,433,381 A | 2/1984 | Wilkinson |
| 4,483,184 A | 11/1984 | Kunzfeld |
| 4,527,523 A | 7/1985 | Daumer et al. |
| 4,532,592 A | 7/1985 | Citron et al. |
| 4,590,563 A | 5/1986 | Matsumura et al. |
| 4,697,561 A | 10/1987 | Citron |
| 4,725,955 A | 2/1988 | Kobayashi et al. |
| 4,814,997 A | 3/1989 | Matsumura et al. |
| 4,829,440 A | 5/1989 | Abe |
| 4,840,245 A | 6/1989 | Kamei et al. |
| 4,852,537 A | 8/1989 | Nagano et al. |
| 4,870,586 A | 9/1989 | Asakura et al. |
| 4,879,656 A | 11/1989 | Quigley et al. |
| 4,884,547 A | 12/1989 | Tamura |
| 4,887,216 A | 12/1989 | Ohnari et al. |
| 4,893,600 A | 1/1990 | Holmes |
| 4,911,128 A | 3/1990 | Hara et al. |
| 4,924,831 A | 5/1990 | Piteo et al. |
| 4,928,652 A | 5/1990 | Shinya et al. |
| 4,951,206 A | 8/1990 | Kyohzuka |
| 4,991,102 A | 2/1991 | Sakamoto et al. |
| 5,021,956 A | 6/1991 | Yoshimura et al. |
| 5,021,959 A | 6/1991 | Jundt et al. |
| 5,086,741 A | 2/1992 | Nakamura et al. |

(Continued)

FOREIGN PATENT DOCUMENTS

| EP | 287038 A2 | * 10/1988 | ........... F02D/13/02 |
|---|---|---|---|
| GB | 2196159 | 4/1988 | |
| GB | 2237388 | 5/1991 | |
| GB | 5313200 | 11/1997 | |
| JP | 54158514 A | * 12/1979 | ........... F02D/13/02 |

Primary Examiner—Henry C. Yuen
Assistant Examiner—Hyder Ali
(74) Attorney, Agent, or Firm—Ernest A Beutler (57) ABSTRACT

A method and apparatus that permits engine system control such as exhaust valve timing without the use of separate load sensors from the output of a single engine timing sensor.

10 Claims, 6 Drawing Sheets

U.S. PATENT DOCUMENTS

| | | | |
|---|---|---|---|
| 5,099,429 A | 3/1992 | Onari et al. | |
| 5,121,324 A | 6/1992 | Rini et al. | |
| 5,127,372 A | * 7/1992 | Fujimoto et al. | ....... 123/65 PE |
| 5,184,589 A | 2/1993 | Nonaka | |
| 5,191,531 A | 3/1993 | Kurosu et al. | |
| 5,218,945 A | 6/1993 | Kapellen et al. | |
| 5,249,130 A | 9/1993 | Mamiya et al. | |
| 5,278,762 A | 1/1994 | Kawamura | |
| 5,284,116 A | 2/1994 | Richeson, Jr. | |
| 5,341,299 A | 8/1994 | Stellwagon et al. | |
| 5,345,817 A | 9/1994 | Grenn et al. | |
| 5,392,753 A | 2/1995 | Burson et al. | |
| 5,445,014 A | 8/1995 | Fiorenza, II et al. | |
| 5,485,382 A | 1/1996 | Seki et al. | |
| 5,548,514 A | 8/1996 | Hasegawa et al. | |
| 5,566,071 A | 10/1996 | Akazaki et al. | |
| 5,575,268 A | 11/1996 | Hirano et al. | |
| 5,577,475 A | 11/1996 | De Backer et al. | |
| 5,629,853 A | 5/1997 | Ogawa et al. | |
| 5,672,817 A | 9/1997 | Sagisaka et al. | |
| 5,681,239 A | 10/1997 | Toukura | |
| 5,684,248 A | 11/1997 | Iwata | |
| 5,988,140 A | 11/1999 | Gartner et al. | |
| 6,023,651 A | 2/2000 | Nakayama et al. | |
| 6,039,012 A | * 3/2000 | Motoyama | .............. 123/65 PE |
| 6,234,145 B1 | 5/2001 | Shomura | |
| 6,272,425 B1 | 8/2001 | Herndon | |
| 6,343,586 B1 | 2/2002 | Muto et al. | |
| 6,626,145 B2 | * 9/2003 | Enoyoshi et al. | ...... 123/406.24 |

* cited by examiner

FIG. 8

EXHAUST TIMING CONTROLLER FOR TWO-STROKE ENGINE

CROSS REFERENCE TO RELATED APPLICATIONS

This application is a continuation in part of the application entitled, "ENGINE CONTROL METHOD AND APPARATUS" Ser. No. 09/682,457, filed, Sep. 5, 2001 now U.S. Pat. No. 6,626,145 in our names and that of another inventor; which application is assigned to the assignee hereof.

BACKGROUND OF INVENTION

This invention relates to an engine control system for controlling an engine system other than the ignition system and in particular to an engine valve control system such as the exhaust control valve of a two cycle engine.

The aforenoted co-pending application disclosed a very simple but highly effective way of determining engine load and controlling an engine ignition system in response to the determined load to improve engine operation. That method and apparatus, because of its simplicity, permits incorporation in relatively small and low production volume engines as used in motorcycles, motor scooters and like engine applications.

In addition to the ignition system, the inventors have realized that there are a number of other engine control systems that are controlled by engine load and these systems generally measure engine load form operator demand, generally determined from the position of the engine throttle control. For example in two cycle engines it is common to employ an exhaust timing controller. These comprise a valve that is effective to change the exhaust timing at the exhaust port and hence the compression ratio in response to the engine revolution and load (see for example JP-A-S54-158514). Conventionally the conventional exhaust timing controller detects the throttle opening in response to the engine rotational speed and the engine load then calculates the valve opening of the exhaust control valve based on the detected engine rotational speed and throttle opening to operate a servomotor which in turn operates the exhaust control valve.

The use of a throttle opening sensor is used in the conventional exhaust timing controller and other engine control systems other than the ignition system to detect the throttle opening results in an increased number of components and a complicated control system. This obviously increases the vehicle cost. In addition small vehicles, in particular, have a layout problem in the position of the various components particularly the throttle position sensor due to the limited space around the engine.

Therefore it is the principle object of the present invention to provide an engine system controller that calculates the engine load without a throttle position sensor.

In addition most engines already have shaft position sensors that detect the angular position of the engine crankshaft for ignition control.

It is therefore another object of the invention to utilize the output of the ignition timing sensor to determine engine load for controlling an engine system other than the ignition system.

SUMMARY OF INVENTION

A first feature of the invention is adapted to be embodied in an internal combustion engine and control therefore. The engine has an engine driven shaft and a timing sensor associated with the shaft for indicating the angular position of the driven shaft. The engine includes an engine control system other than an ignition system for controlling an engine operation other than ignition The other engine control system is controlled by the output of the timing sensor.

In accordance with another feature of the invention, the other engine control system controls the valve timing of the engine.

In accordance with still another feature of the invention the valve timing of the engine controlled is the exhaust timing valve of a two cycle engine.

DETAILED DESCRIPTION

Before describing the invention in detail by reference to the figures hereof, the disclosure of the aforenoted copending application is hereby incorporated by reference as it shows more details of the basic type of engine with which the invention may be utilized and also a basic spark control apparatus and method. However it is also believed that from the following description those skilled in the are will readily understand how to practice the invention, not only with the basic structure and methodology as shown in that application, but also with a wide variety of engine system controls where engine load determination is required.

Figure 1:
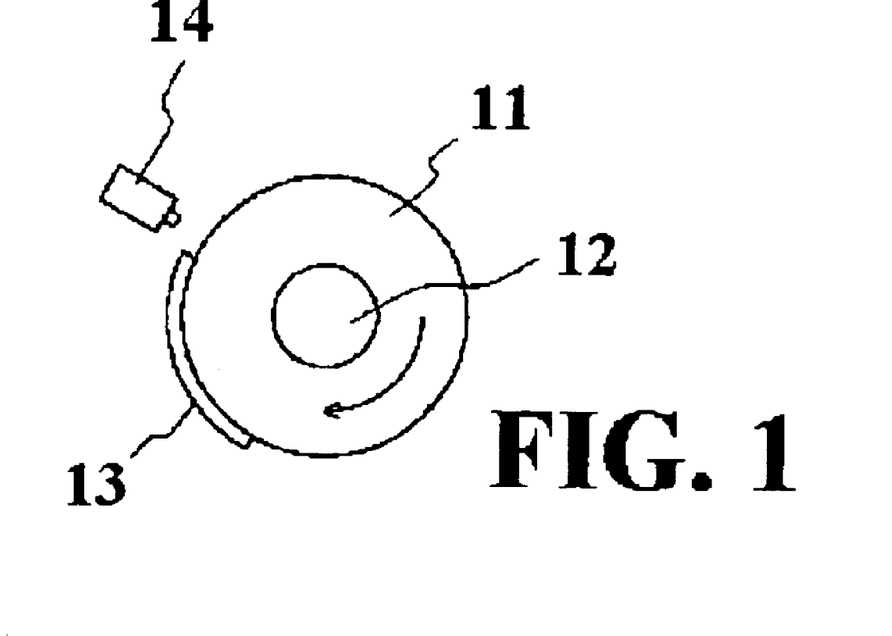
FIG. 1 is a view showing an engine shaft speed sensor employed with the engine system control structure and method of the invention.

Referring now in detail to the drawings and initially to FIG. 1, an engine timing sensor is depicted as associated, for example, with an engine driven shaft element of an associated internal combustion engine of any desired type. Specifically a flywheel 11 is affixed for rotation with an engine shaft and specifically in this embodiment a crankshaft 12. The crankshaft 12 is journalled for rotation within a body of the engine, as is well known in this art. The flywheel 11 carries a timing mark 13, which as noted in the aforenoted co-pending application has a greater circumferential extent than those normally used in the art. In a preferred embodiment the circumferential length of the mark 13 is about 60° of crankshaft rotation and the leading edge of the mark 13 is a few degrees before top dead center (tdc).

Figure 2:
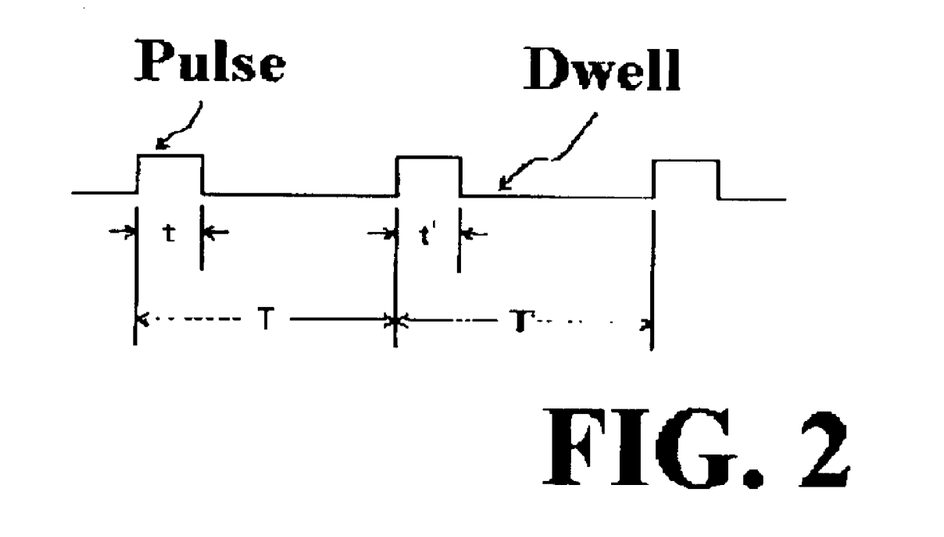
FIG. 2 is a graphical view showing the output of the sensor shown in FIG. 1.

A sensor coil 14 cooperates with the timing mark 13 and generates positive and negative pulses as the leading and trailing edges of the timing mark 13 pass the sensor. These pulses are roughly approximated as shown in FIG. 2. The remaining portion of the rotation causes no output as also shown in FIG. 2. A conventional ignition timing sensor may be used for the sensor coil 14.

The time interval T between two leading edge pulse signals is the time for the shaft 12 to complete one revolution and hence the instantaneous shaft speed for this revolution is the inverse function of that time interval. On the other hand, the time interval t for the timing mark 13 to pass the sensor coil 14 is the instantaneous time for the shaft 12 to complete a partial revolution immediately before tdc.

As noted in the aforenoted co-pending application, the ratio t/T calculated as a degree of rotational variation "D" is directly related to engine load. Thus the engine load is determined using a map stored in a memory of a microcomputer. As for the map, the correlation between the degree of rotational variation, the rotational speed of the crankshaft and the engine load is determined by a preliminary experiment or the like, and the three-dimensional map obtained is stored in the memory. Thus the exhaust valve timing for the engine can be set using this data.

Figure 3:
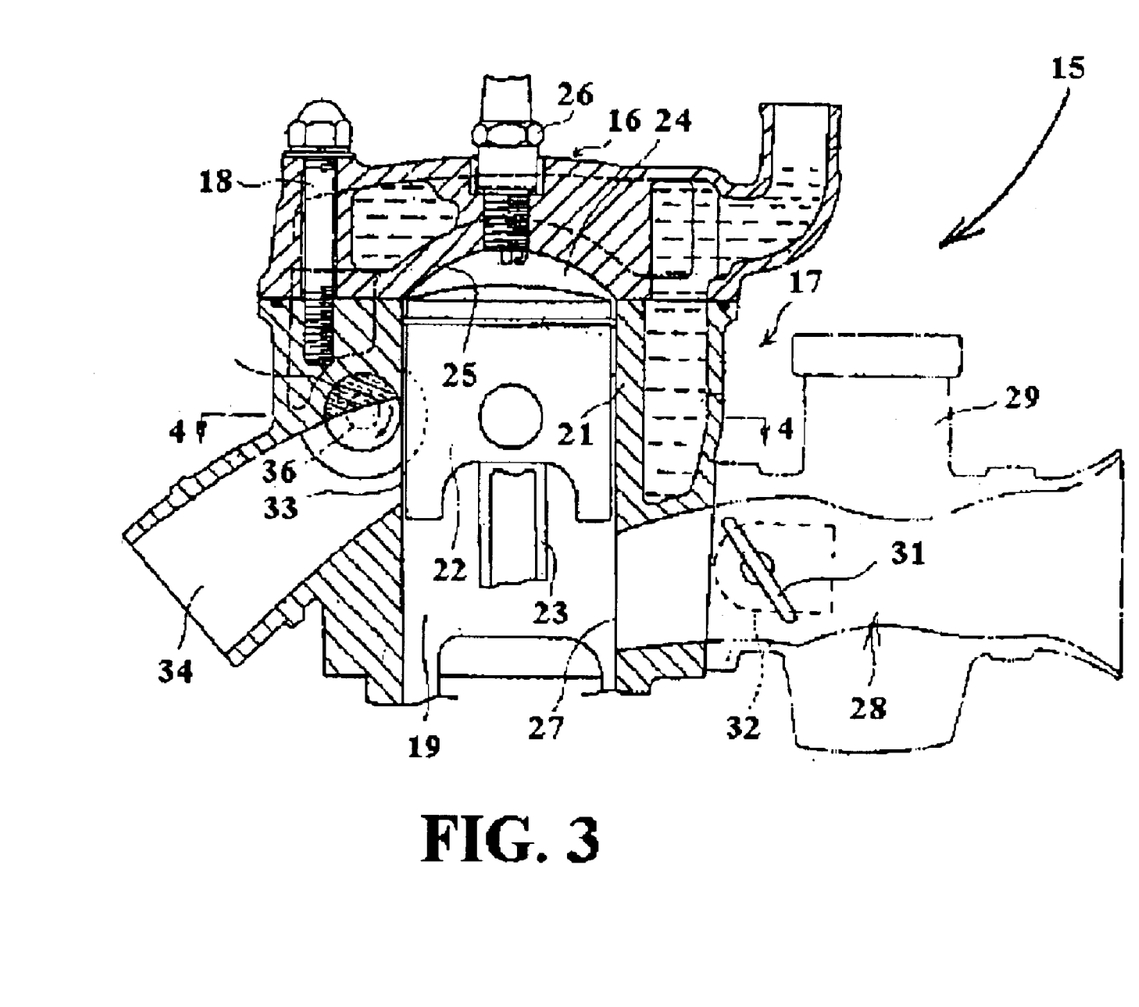
FIG. 3 is a side elevational view of a two cycle internal combustion engine with a portion shown in cross sectional view taken through a cylinder of the engine.
Figure 4:
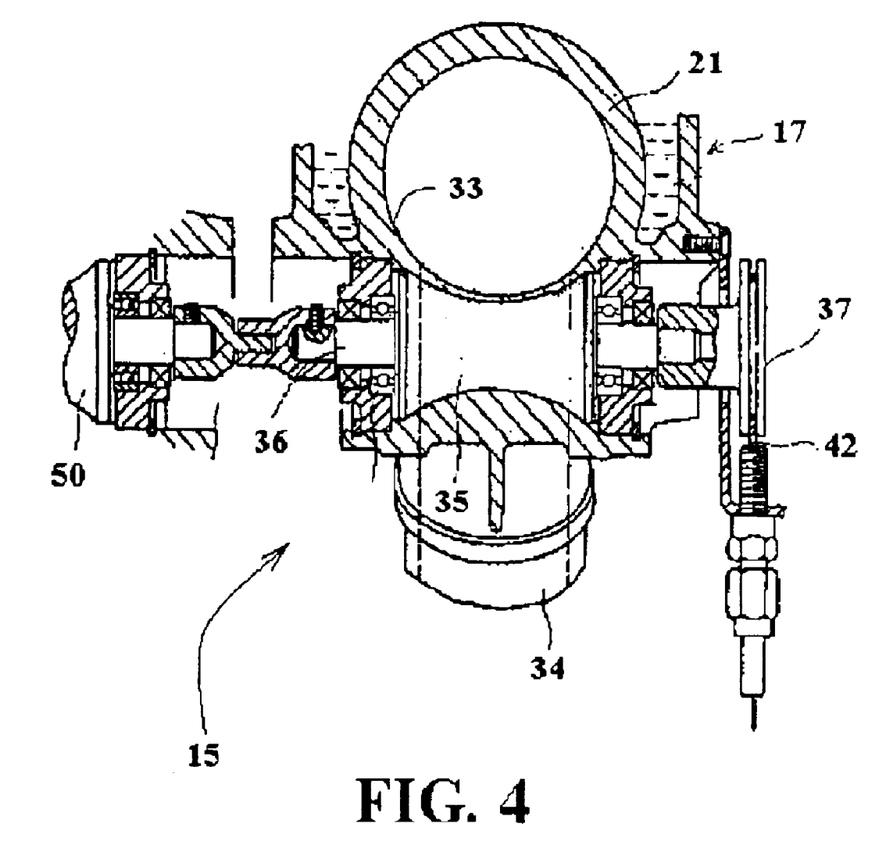
FIG. 4 is a cross sectional view taken along the line 4—4 in FIG. 3.

Referring now in detail to the remaining figures and initially primarily to FIGS. 3 and 4, a two cycle internal combustion engine is shown and indicated generally by the reference numeral 15. The engine includes a cylinder head 16 is fastened to the upper part of a cylinder block 17 by a plurality of fasteners 18, only one of which is shown.

The cylinder block 17 forms at least one cylinder bore 19 is formed inside a cylinder sidewall 21 of the cylinder block 17 in which a piston 22 reciprocates. The piston 22 is connected to and drives the crankshaft 11 by a connecting rod 23 in a well known manner. A combustion chamber 24 is formed by the cylinder bore 19, the upper surface of the piston 22 and a recess 25 formed in the lower surface of the cylinder head 16. A spark plug 26 is mounted on the cylinder head 16 facing the combustion chamber 24 for firing a charge delivered thereto in a manner to be described next.

An inlet port 27 is opened to the cylinder sidewall 21. An intake passage 28 communicates with the inlet port 27. This intake passage 28 include a carburetor 29 having a throttle valve 31 is mounted in the intake passage 28 adjacent to the downstream side of the carburetor 29. Normally a throttle-opening sensor, shown by dotted lines and indicated by the reference numeral 32 would be employed for detecting the engine load, which has been conventionally provided. In the embodiment of the present invention the engine load is calculated based on the engine rotational speed as described above and therefore the throttle opening sensor 32 is omitted as unnecessary.

An exhaust port 33 is formed on the opposite side of the inlet port 27 in the cylinder sidewall 21 and at the position higher than the inlet port 27. An exhaust passage 34 is formed in communication with the exhaust port 33 and communicates with an exhaust system of any known type (not shown) for discharging the exhaust gasses to the atmosphere.

An exhaust control valve 35 of generally semicircular cross-section and which may be of any desired type for controlling the exhaust timing is journaled at the upper edge of the exhaust port 33. As has been noted above, this is to vary the compression ratio of the engine relative to load. The exhaust control valve 35 is of generally semicircular cross-section and shaped like an hourglass as shown in FIG. 4. The exhaust control valve 35 has a rotational shaft 36 is supported on the cylinder block side via bearings 37.

Figure 5:
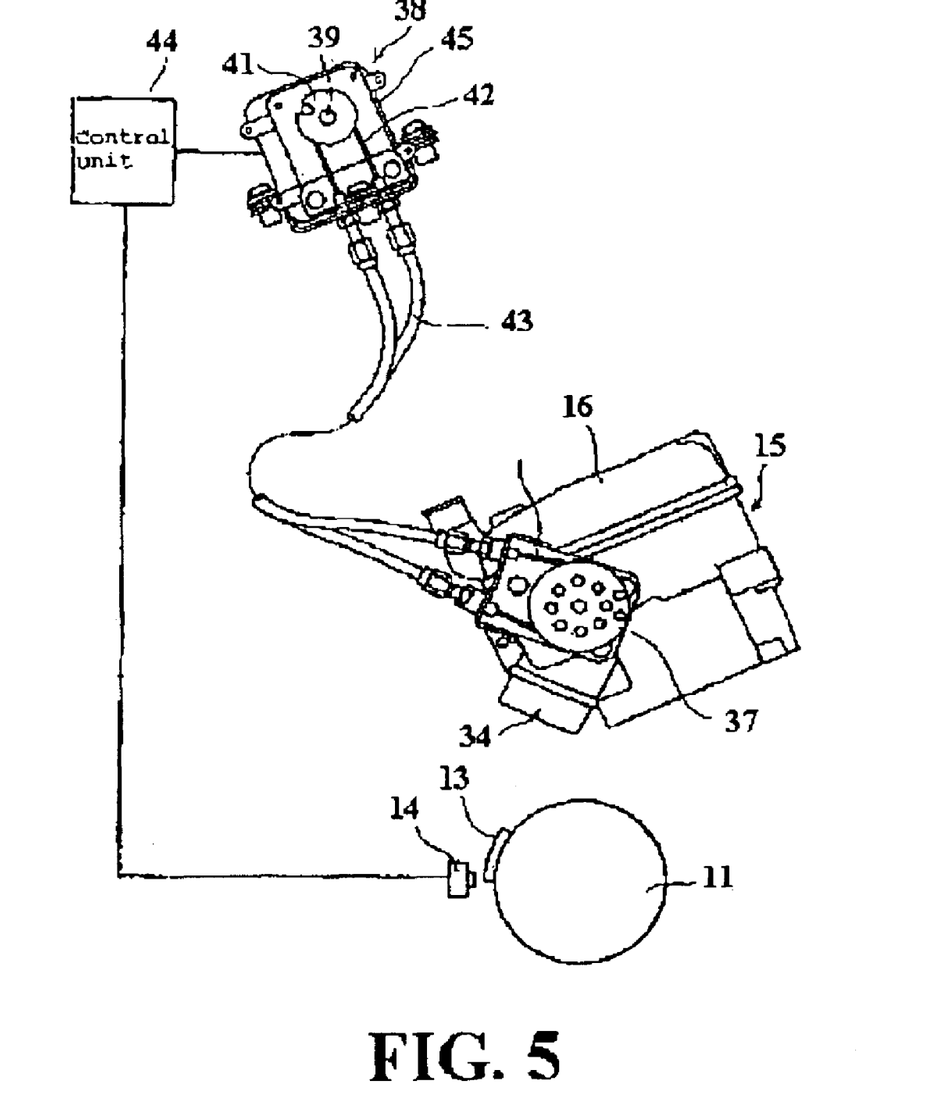
FIG. 5 is a view showing the relation between the timing sensor and the engine exhaust valve controller.

The rotational position of the exhaust control valve 35 is controlled by a pulley 37 is connected to one end of the rotational shaft 36. This pulley 37 is operated by the mechanism best shown in FIGS. 5–7. As show in these figures, a servo motor unit, indicated generally at 38, has a drive shaft 39, to which a drive pulley 41 is fixed. Wrapped around the drive pulley 41 is a transmitter wire 42 is wrapped. The wire 42 passes through two outer tubes 43 to be connected to the pulley 37 on the exhaust control valve side.

As described above, the sensor coil 14 on the flywheel 11 detects the timing mark 13 and is connected to a control unit 44. The control unit 44 controls the motor unit 38 based on the signal transmitted from the sensor coil 4 in a manner to be described later by reference to FIG. 8. In practice, the control unit 44 is incorporated into a case 45 of the servo motor unit 38.

Figure 6:
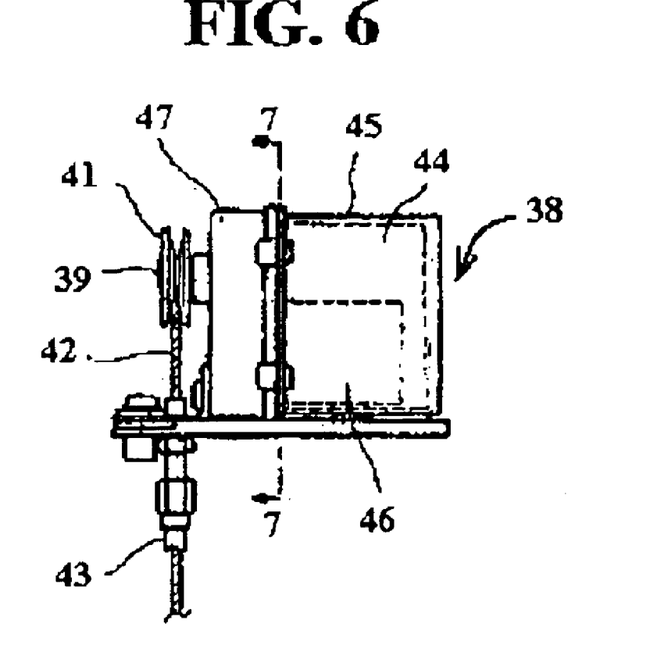
FIG. 6 is a side elevational view of the valve controlling servo motor.
Figure 7:
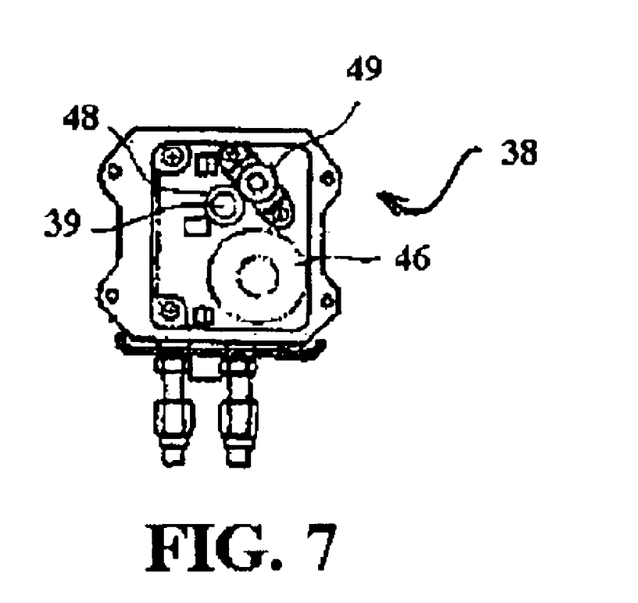
FIG. 7 is a cross sectional view taken along the line 7—7 in FIG. 6.

As shown in FIG. 6, the motor unit 38 mounts a servomotor 46 in the case 45 of the motor unit 38. An output shaft of the servomotor 46 is connected to the drive shaft 39 via a step down gear set (not shown) positioned in a gear case 47. As shown in FIG. 7, a pinion 48 is attached to the end of the drive shaft 39. A potentiometer 49 is provided so as to be engaged with the pinion 48. The potentiometer 49 detects the rotational position of the drive shaft 39. As noted the drive shaft 39 is connected to the pulley 37 for operating the exhaust control valve 35 to open and close via the drive pulley 41 fixed to the drive shaft and the wire 42. The valve opening of the exhaust control valve 35 is therefore detected by the potentiometer 49.

In the configuration described above, when the servomotor 46 is rotated in normal or reverse direction based on its rotating amount calculated by the control unit 44, the drive pulley 41 fixed to the drive shaft 39 rotates and accordingly the pulley 37 rotates via the wire 42. This allows the exhaust control valve 35 on the rotational shaft 36 (FIG. 4), which is connected to the pulley 37, to rotate for opening and closing, changing an upper-end position of the exhaust port 33 (shown in FIG. 3) to control the exhaust timing.

The system providing this control and practicing the invention will now be described by reference to FIG. 8. As has been noted the output of the sensor coil 14 is used to determine engine load. When the engine load is calculated, the change in the degree of rotational variation may be used as a parameter of a map. That is, after calculation of the degree of rotational variation D=t/T described above, likewise, a detection time t", during which the projection rail has been detected, and a period T of the next revolution are measured and the ratio t"/T" is calculated. The difference between these two degrees of rotational variation (t/T−t"/T"), is calculated as a change D" of the degree of rotational variation. The engine load may be calculated based on the D".

Figure 8:
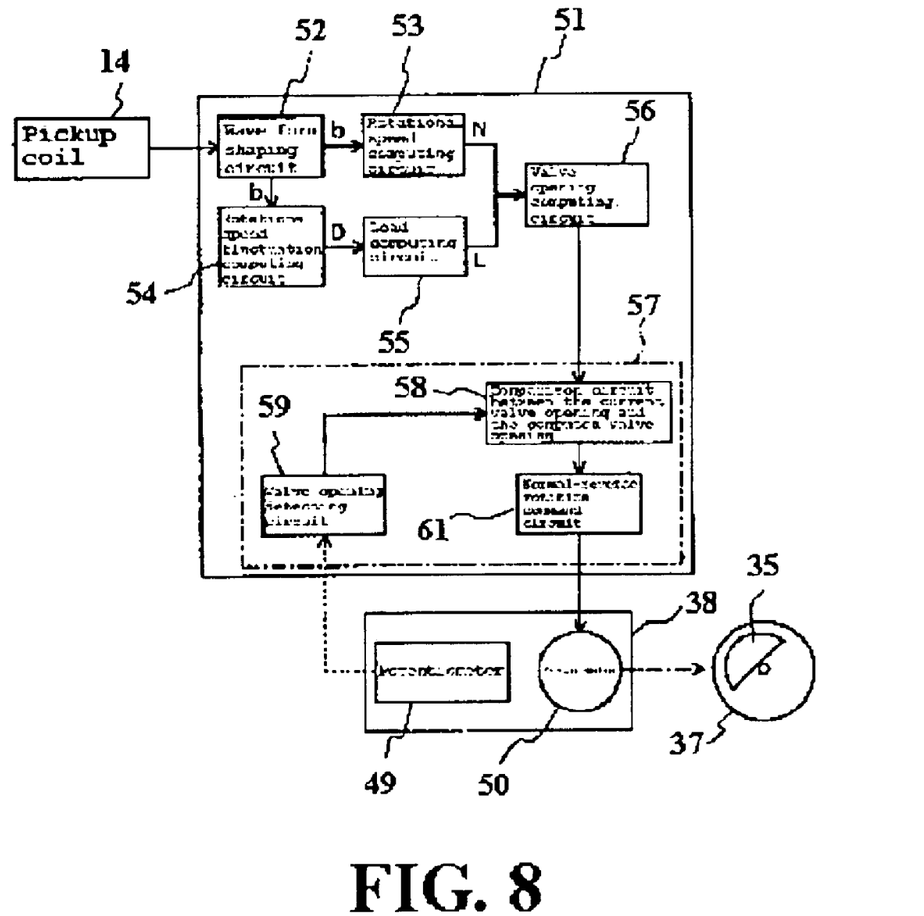
FIG. 8 is a schematic diagram showing the exhaust valve control system.

Referring now specifically to FIG. 8, the exhaust control valve 35 for controlling the exhaust timing is driven for rotation in the normal-reverse direction by the servomotor 46 under the control of a control unit indicated generally at 51. The control unit 51 is provided with a waveform shaping circuit 52 connected to the output of the sensor coil 44. Both a rotational speed calculation circuit 53 and a degree-of-rotational variation calculation circuit 54 receive the output of the waveform shaping circuit 52.

A load calculation circuit 55 calculates the engine load based on the degree of rotational variation. As has been noted this may be done by reference to a map. Then a valve opening calculation circuit 56 calculates the opening of the exhaust control valve 35 so as to provide optimal exhaust timing for the driving condition in response to the rotational speed and the engine load.

This output is then transmitted to a motor drive circuit 57 for controlling the servomotor 46 based on the calculated valve opening. The motor drive circuit 57 is provided with a comparison circuit 58 for comparing the current opening of the exhaust control valve 35 to the calculated opening. Also a valve opening detecting circuit 59 detects the current opening of the exhaust control valve 35 and a normal-reverse rotation command circuit 61 for transmitting commands to the servomotor 46 to be driven for rotation in either the normal or reverse direction.

The waveform shaping circuit 52 generates the revolution detection signal b as shown in FIG. 2 described above based on the detection signal provided by the sensor coil 14. The rotational speed calculation circuit 53 calculates rotational speed N determined by the time interval T. The degree of rotational variation calculation circuit 54 calculates the variation D based on the revolution detection signal T as described above. The load calculation circuit 55 calculates engine load L based on the calculated degree of rotational variation D. Based on the data determined by a preliminary experiment, one-dimensional mapping is allowed using the degree of rotational variation D as a parameter or two-dimensional mapping is allowed using the degree of rotational variation D and the rotational speed N as parameters, which is stored in the CPU memory. This map can be used to calculate the engine load.

The valve opening calculation circuit 56 calculates the target valve opening to control the exhaust control valve 35 so as to provide optimum exhaust timing for the driving condition based on the calculated rotational speed N and the engine load L. Based on the data determined by a preliminary experiment for example, two-dimensional mapping is allowed using the rotational speed N and the engine load L as parameters, which is stored in the CPU memory. This map allows for calculation of the target valve opening.

Using the degree of rotational variation D and the rotational speed N as parameters allows for mapping to calculate the valve opening without determining the engine load L based on the degree of rotational variation D. The valve opening may also be determined based on this mapping. In such a case, the degree-of-rotational variation calculation circuit 54 and the load calculation circuit 55 would be integrated into a single calculation circuit combining both functions thereof.

The valve opening detecting circuit 59 detects the current opening of the exhaust control valve. 35 based on the motor position measured by the potentiometer 49 in the servomotor 46. The comparison circuit 58 compares the current valve opening detected by the valve opening detecting circuit 59 to the target valve opening calculated by the valve opening calculation circuit 56, and determines valve displacement of the exhaust control valve 35 in opening or closing direction so as to eliminate the difference. The comparison circuit then calculates the amount by which the servomotor 46 is driven for rotation in normal or reverse direction in response to the displacement. The normal-reverse rotation command circuit 61 drives the servomotor 46 based on the amount, by which the servomotor is driven, that was calculated by the comparison circuit 58.

Thus it should be readily apparent that the described construction permits the effective control of an engine system such as its exhaust valve control system without requiring a separate load sensor. Of course those skilled in the art will understand that the described embodiments are merely preferred embodiments and that various changes and modifications may be made without departing from the spirit and scope of the invention, as set out in the claims.

What is claimed is:

1. An internal combustion engine and control therefore comprising an engine driven shaft, a timing sensor associated with said shaft for indicating the angular position of said driven shaft, an engine control system other than an ignition system for controlling an engine operation other than ignition, said other engine control system being controlled by the output of said timing sensor, said timing sensor sensing the instantaneous rotational speed of said driven shaft during the rotation of said driven shaft for less than a complete rotation and senses the rotational speed of said driven shaft for a complete revolution thereof including the measured less than complete rotation, and determines the engine basic condition from these measurements for controlling said other engine control system in response to the determined basic engine condition rather than solely engine speed.

2. An internal combustion engine and control system therefore as set forth in claim 1, wherein the engine basic condition is determined by the change in engine speed during successive intervals.

3. An internal combustion engine system control as set forth in claim 2 wherein the timing sensor comprises a single sensor.

4. An internal combustion engine system control as set forth in claim 3 wherein the other engine control system is operated solely in response to the sensed rotational speed condition without any other sensor inputs.

5. An internal combustion engine system control as set forth in claim 1 wherein the other engine control system controls a valve timing of the engine.

6. An internal combustion engine system control as set forth in 5 wherein the valve timing controlled is the exhaust valve.

7. An internal combustion engine system control as set fort in claim 6 wherein the engine operates on a two cycle principle.

8. An internal combustion engine and control system therefore as set forth in claim 7, wherein the engine basic condition is determined by the change in engine speed during successive intervals.

9. An internal combustion engine system control as set forth in claim 7 wherein the timing sensor comprises a single sensor.

10. An internal combustion engine system control as set forth in claim 9 wherein the valve timing control is done solely in response to the sensed rotational speed condition without any other sensor inputs.

* * * * *